(12) United States Patent
Van Niekerk et al.

(10) Patent No.: US 9,631,655 B2
(45) Date of Patent: Apr. 25, 2017

(54) COMPONENT CONNECTION AND METHOD FOR CONNECTING TWO COMPONENTS

(71) Applicant: Bayerische Motoren Werke Aktiengesellschaft, Munich (DE)

(72) Inventors: Johann Van Niekerk, Munich (DE); Maik Hammer, Bruckberg (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 15/164,970

(22) Filed: May 26, 2016

(65) Prior Publication Data

US 2016/0265567 A1 Sep. 15, 2016

Related U.S. Application Data

(63) Continuation of application No. PCT/EP2014/077267, filed on Dec. 10, 2014.

(30) Foreign Application Priority Data

Jan. 13, 2014 (DE) .......... 10 2014 200 391

(51) Int. Cl.
*B25G 3/34* (2006.01)
*F16B 11/00* (2006.01)
(Continued)

(52) U.S. Cl.
CPC .......... *F16B 5/0642* (2013.01); *F16B 21/07* (2013.01); *Y10T 29/49908* (2015.01); *Y10T 403/477* (2015.01)

(58) Field of Classification Search
CPC ......... Y10T 403/32795; Y10T 403/447; Y10T 403/4966; Y10T 29/49826;
(Continued)

(56) References Cited

U.S. PATENT DOCUMENTS 2,275,900 A * 3/1942 Hall ............... B23K 11/002
24/662
4,407,320 A * 10/1983 Levine ........... H01L 31/035281
136/250
(Continued)

FOREIGN PATENT DOCUMENTS

CN 102834218 A 12/2012
DE 34 41 349 A1 5/1986
(Continued)

OTHER PUBLICATIONS

International Search Report (PCT/ISA/210) issued in PCT Application No. PCT/EP2014/077267 dated Mar. 24, 2015, with English translation (four (4) pages).
(Continued)

*Primary Examiner* — Gregory Binda
*Assistant Examiner* — Nahid Amiri
(74) *Attorney, Agent, or Firm* — Crowell & Moring LLP

(57) ABSTRACT

A component connection includes a first component which has a through-hole, from the hole rim of which at least one clamping element projects towards a first side of the first component, and a second component which has a through-hole, from the hole rim of which at least one clamping element projects towards a first side of the second component. The two components bear against one another with their sides remote from the first sides. A connecting element has at least two spherical or spheroidal elements and extends through the two through-holes such that the at least one clamping element of the first component bears against a first of the at least two spherical or spheroidal elements and the at least one clamping element of the second component bears in a clamping manner against a second of the at least two spherical or spheroidal elements.

20 Claims, 1 Drawing Sheet

(51) Int. Cl.
*F16B 12/04* (2006.01)
*F16L 13/00* (2006.01)
*F16B 5/06* (2006.01)
*F16B 21/07* (2006.01)

(58) Field of Classification Search
CPC ......... Y10T 29/49908; Y10T 29/49915; Y10T 29/49936; Y10T 29/49947; F16B 21/07; F16B 5/0642
USPC .................... 403/142, 266, 282, 270; 29/428
See application file for complete search history.

(56) References Cited

U.S. PATENT DOCUMENTS

| | | | | |
|---|---|---|---|---|
| 4,541,559 | A | * | 9/1985 | O'Brien ................ G08B 13/24 156/250 |
| 4,637,116 | A | | 1/1987 | Parisch et al. |
| 4,992,138 | A | * | 2/1991 | Jensen ...................... C23F 1/02 136/250 |
| 5,744,759 | A | | 4/1998 | Ameen et al. |
| 6,070,785 | A | * | 6/2000 | Ameen ................... H01R 4/02 228/115 |
| 2013/0031756 | A1 | * | 2/2013 | Yuen ..................... F16B 5/0642 24/702 |
| 2013/0071181 | A1 | | 3/2013 | Herzinger et al. |
| 2013/0185916 | A1 | | 7/2013 | Mantei et al. |
| 2013/0269873 | A1 | | 10/2013 | Herzinger et al. |
| 2014/0143989 | A1 | | 5/2014 | Herzinger et al. |
| 2015/0033532 | A1 | | 2/2015 | Van Niekerk et al. |

FOREIGN PATENT DOCUMENTS

| | | | | |
|---|---|---|---|---|
| DE | 10 2010 040 547 A1 | | 3/2012 | |
| DE | 10 2010 063 717 A1 | | 6/2012 | |
| DE | 10 2012 206 938 B3 | | 2/2013 | |
| DE | 102013218649 B3 | * | 9/2014 | ............ F16B 5/0642 |
| DE | 102013218650 A1 | * | 3/2015 | ............ F16B 21/075 |
| DE | 102014202629 A1 | * | 8/2015 | ............ B23K 26/26 |
| GB | 2470179 A | | 11/2010 | |
| WO | WO 2012/084090 A2 | | 6/2012 | |
| WO | WO 2013/017381 A1 | | 2/2013 | |
| WO | WO 2013/017382 A1 | | 2/2013 | |

OTHER PUBLICATIONS

German Office Action issued in counterpart German Application No. 10 2014 200 391.1 dated Oct. 6, 2014 (five (5) pages).

Chinese-language Office Action issued in counterpart Chinese Application No. 201480058072.X dated Dec. 15, 2016 with English translation (20 pages).

* cited by examiner

COMPONENT CONNECTION AND METHOD FOR CONNECTING TWO COMPONENTS

CROSS REFERENCE TO RELATED APPLICATIONS

This application is a continuation of PCT International Application No. PCT/EP2014/077267, filed Dec. 10, 2014, which claims priority under 35 U.S.C. §119 from German Patent Application No. 10 2014 200 391.1, filed Jan. 13, 2014, the entire disclosures of which are herein expressly incorporated by reference.

This application contains subject matter related to U.S. application Ser. No. 15/164,964, entitled "Component Connection" filed on even date herewith.

BACKGROUND AND SUMMARY OF THE INVENTION

The present invention relates to a component connection having first and second components with through holes and a connecting element. The present invention also relates to a method for connecting a first component that has a through-hole to a second component that has a through-hole.

A component connection in which use is made of a connecting element which has two or more spherical or spheroidal elements that are connected together is known from DE 10 2012 206 938 B3.

It is the object of the invention to provide a method by which two components that each have a through-hole can be connected together easily in an initially "floating" manner, and to provide a corresponding component connection.

The starting point of the invention is a component connection for connecting a first component to a second component. The first component has a through-hole, from the "hole rim" of which at least one clamping element protrudes toward a first side of the first component. The at least one clamping element can be formed by a bent-over or bent-up peripheral portion of the hole rim of the first component. The at least one clamping element can be formed, for example, by an encircling clamping collar or by a plurality of clamping collar portions that are spaced apart from one another and arranged in a distributed manner in the circumferential direction.

The second component likewise has a through-hole, from the "hole rim" of which at least one clamping element protrudes toward a first side of the second component. The at least one clamping element of the second component can likewise be formed by a bent-over or bent-up peripheral portion of the hole rim. Here, too, the at least one clamping element can be formed by an encircling clamping collar or by a plurality of clamping collar portions that are spaced apart from one another in the circumferential direction.

According to the invention, the two components are joined together such that they bear against one another with their second sides that face away from the first sides. "Bear" can mean that they bear directly against one another, i.e. they are in direct contact with one another. However, this does not necessarily have to be the case. In principle, an intermediate layer, for example an adhesive layer, a layer formed by a third component, or the like, could be provided between the second sides of the two components.

An essential element of the invention is formed by a connecting element. The connecting element has at least two spherical or spheroidal elements. The connecting element extends through the two through-holes, specifically such that the at least one clamping element of the first component bears against a first of the at least two spherical or spheroidal elements from the outside in a clamping manner and the at least one clamping element of the second component bears against a second of the at least two spherical or spheroidal elements in a clamping manner.

By means of such a connecting element, the two components can be clamped together easily in a "floating" manner. "Floating" means that the two clamped-together components can be displaced relative to one another at least to a certain extent after they have been clamped together. Such floating, pre-fixing, of two components opens up a multiplicity of possible applications. Such a component connection can be used, for example, for the pre-fixing of two vehicle body parts that are intended to be connected firmly together, for the pre-fixing of an add-on part to a vehicle body part, or the like.

Provision can be made for the connecting element to have two spherical or spheroidal elements that are connected together. Provision can be made in particular for the connecting element to be formed by precisely two spheres that are connected together. The two spherical or spheroidal elements or spheres can, in particular, be connected together cohesively, for example by welding.

According to one development of the invention, provision is made for at least one of the clamping elements, in particular each clamping element of the first and/or of the second component, to bear against the connecting element from the outside in a particular region. The region is located between equatorial planes of the spherical or spheroidal elements. If one imagines a connecting line through the centers of the spherical or spheroidal elements, then the equatorial planes of the spherical or spheroidal elements are perpendicular to this connecting line. If the clamping elements bear against the spherical or spheroidal elements from the outside in the region between the equatorial planes, a particularly high clamping or pull-out force arises.

As already indicated above, a straight line that extends through the centers of the spherical or spheroidal elements does not have to be exactly perpendicular with respect to a tangential plane of the first and/or of the second component in the region of the associated through-hole, i.e. not exactly perpendicular to the two components in the region of the through-holes. Rather, the straight line extending through the centers of the spherical or spheroidal elements can be inclined with respect thereto. As a result of such a "floating mounting", it is thus possible for manufacturing tolerances to be compensated to a certain extent.

As already indicated, provision can be made for the at least one clamping element of the first component and/or the at least one clamping element of the second component to be connected integrally to the first or the second component. The at least one clamping element of the first component and/or of the second component can be formed, for example, by a bent-over hole rim of the first or second component.

In addition to the clamping connection, the two components can be connected firmly together permanently or firmly together in some other way. After the two components have been pre-fixed via the connecting element, the two components can be welded, screwed, riveted or adhesively bonded together or connected firmly together in some other way.

In particular, provision can be made for the two components to be oriented with respect to one another by a form-fitting connection in addition to the clamping connection. For example, the first component can have an elevation and the second component a complementary depression in which the elevation engages in a form-fitting manner, or vice versa.

Alternatively or in addition thereto, it is also possible for centering holes to be provided in the two components, a centering element, for example a centering pin, being inserted into the centering holes. The centering pin positions the two components distinctly relative to one another at least at the location of the centering holes.

Provision can furthermore be made for the clamping element of the first component to be welded to the first spherical element and/or for the clamping element of the second component to be welded to the second spherical element.

If one of the clamping elements is formed by an encircling clamping collar, the encircling clamping collar can be circumferentially welded to the associated spherical or spheroidal element.

For the sake of completeness, the method according to the invention is also described. Specifically, it is a method for connecting a first component that has a through-hole to a second component that has a through-hole. The method includes the following acts: placing the two components against one another such that the through-holes at least partially overlap one another; and connecting the two components in a clamped manner by attaching a connecting element which has at least two spherical or spheroidal elements, such that a first of the spherical or spheroidal elements projects out of the through-hole in the first component on a first side of the first component, and a second of the spherical or spheroidal elements projects out of the through-hole in the second component on a first side of the second component that faces away from the first side of the first component. A clamping element protrudes from a hole rim of the first component. The clamping element bears against the first of the spherical or spheroidal elements from the outside in a clamping manner. A clamping element protrudes from a hole rim of the second component. The clamping element bears against the second of the spherical or spheroidal elements from the outside in a clamping manner.

The clamping element can be welded to a spherical or spheroidal element bearing against it, for example, by laser welding. This has the advantage that the welding apparatus can be arranged at a distance from the component connection.

Tests have shown that a spherical or spheroidal element, as a connecting element according to the invention, can be detected very well and precisely by an optical detection device. The spherical or spheroidal elements of the connecting element thus form, on account of their shape, a very precisely detectable element with regard to their respective position. The position signals generated by a corresponding detection device can be supplied to the welding device (e.g. laser welding device). In this way, high-quality welded connections can be produced in a precise position.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
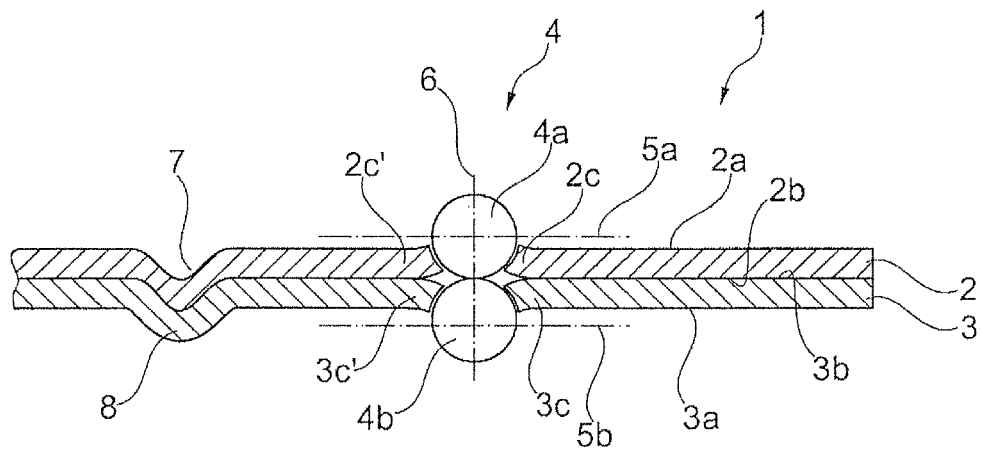
FIG. 1 is a schematic diagram of an exemplary embodiment according to the invention, in which the connecting element is perpendicular to the two components.

FIG. 1 shows a component connection 1 that consists of a first component 2 and a second component 3. One or both components 2 and/or 3 can be, for example, a metal sheet, a plastics component, in particular a fiber-reinforced plastics component, or the like. The first component 2 has a top side 2a, which is also denoted first side in the following text, and a second side 2b that faces away from the first side.

The second component 3 likewise has a first side 3a, which forms an underside here, and a second side 3b that faces away from the first side 3a. The two second sides 2b, 3b of the two components 2, 3 bear against one another. The two first sides 2a, 3a of the two components 2, 3 face away from one another.

The first component 2 has a through-hole, from the hole rim of which at least one clamping element 2c protrudes toward the first side 2a of the first component 2. The clamping element 2c is formed by a somewhat upwardly bent peripheral portion of the hole rim. For example, provision can be made for the entire hole rim to be bent up somewhat. In this case, the clamping element is a single clamping element, i.e. by an encircling clamping rim (collared hole).

Alternatively, provision can also be made of a plurality of clamping elements 2c, 2c' that are spaced apart in the circumferential direction.

The second component 3 likewise has a through-hole, from the hole rim of which at least one clamping element 3c protrudes toward the first side 3a of the second component 3. Here, too, an encircling clamping rim can be provided. Alternatively, a plurality of somewhat downwardly (in relation to the figure) bent clamping elements 3c, 3c' that are spaced apart from one another in the circumferential direction can be provided here, too.

As is apparent from FIG. 1, the two components 2, 3 are oriented with respect to one another so that the two through-holes overlap one another completely or at least partially. In the arrangement shown in FIG. 1, the two through-holes are oriented in a substantially concentric manner relative to one another. A connecting element 4 extends through the two through-holes. The connecting element 4 has a first spherical element 4a and a second spherical element 4b connected thereto. The two spherical elements 4a, 4b are connected directly together in the exemplary embodiment shown in FIG. 1, i.e. they bear directly against one another. However, this does not necessarily have to be the case. The connecting element could also be shaped for example like a dumbbell, i.e. there could be a further connecting portion between the two spherical elements 4a, 4b.

The two spherical elements 4a, 4b can be, for example, welded together or connected together cohesively in some other way. The spherical elements 4a, 4b can be formed in particular by two spheres that consist of metal, for example steel spheres, aluminum spheres, or the like.

As is apparent from FIG. 1, the connecting element 4 is arranged such that the two spherical elements 4a, 4b protrude somewhat from the through-holes which are provided in the two components 2, 3. The equatorial planes 5a, 5b of the two spherical elements are indicated by dashed lines. The equatorial planes 5a, 5b extend through centers of the two spherical elements 4a, 4b and are perpendicular to a straight line 6 that connects the two centers. The straight line 6 extends here approximately or exactly through the centers of the through-holes provided in the two components 2, 3. Accordingly, the connecting element 4 is perpendicular to the, in this case, substantially planar components 2, 3 in FIG. 1.

As is apparent from FIG. 1, the clamping elements 2c, 2c' of the first component 2 and the clamping elements 3c, 3c' of the second component 3 bear against the respectively associated spherical element 4a and 4b from the outside in a region between the two equatorial planes 5a, 5b. This results in a particularly high clamping or pull-out force. By way of such a component connection, the two components 2, 3 can thus already be pre-fixed firmly together or connected relatively firmly together in a releasable or detachable manner.

As is apparent from FIG. 1, the first component 2 has a nose-like elevation 7 and the second component 3 has a hollow-like depression 8 that is shaped in a substantially complementary manner thereto. The elevation 7 engages in the depression 8 in a form-fitting manner, with the result that the two components 2, 3 are additionally positioned relative to one another.

Figure 2:
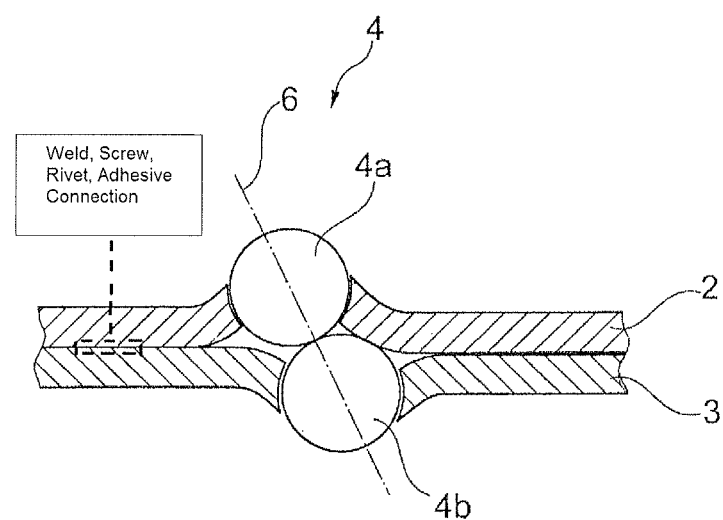
FIG. 2 is a schematic diagram of an exemplary embodiment in which the connecting element is inclined with respect to the two components.

The component connection shown in FIG. 1 allows "floating pre-fixing" of the two components 2, 3, this being apparent from FIG. 2. The expression "floating pre-fixing" should be understood as meaning that the straight line 6 connecting the two centers of the spherical or spheroidal elements 4a, 4b does not necessarily have to be perpendicular relative to a tangential plane of the first and/or of the second component in the region of the associated through-hole, but rather, as illustrated in FIG. 2, can also be at least somewhat inclined. The components 2, 3 connected together via the connecting element 4 can thus still be displaced relative to one another at least to a certain extent and also depending on the design of the nose 7 and depression 8, if provided.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A component connection, comprising:
   a first component having a through-hole, wherein at least one clamping element projects toward a first side of the first component from a rim of the through-hole;
   a second component having a through-hole, wherein at least one clamping element projects toward a first side of the second component from a rim of the through-hole;
   a connecting element comprising at least two spherical or spheroidal elements, wherein
   the first and second components bear against one another on respective sides that face away from the first sides,
   the connecting element extends through the through-holes of the first and second components such that
   the at least one clamping element of the first component bears against a first of the at least two spherical or spheroidal elements, and
   the at least one clamping element of the second component bears against a second of at least two spherical or spheroidal elements.

2. The component connection according to claim 1, wherein the connecting element comprises only two spheres connected together.

3. The component connection according to claim 2, wherein the two spheres are integrally connected together.

4. The component connection according to claim 3, wherein the integral connection of the two spheres is a welded connection.

5. The component connection according to claim 1, wherein:
   the at least one clamping element of the first component bears externally against the first of the at least two spherical or spheroidal elements in a region between parallel equatorial planes, each plane extending through a respective center point of the respective spherical or spheroidal element, and
   the at least one clamping element of the second component bears externally against the second of the at least two spherical or spheroidal elements in the region.

6. The component connection according to claim 1, wherein
   a straight line extending through centers of the two spherical or spheroidal elements is inclined with respect to a tangential plane of the first and/or second component in a region of the respective through-hole of the first and/or second component.

7. The component connection according to claim 1, wherein the at least one clamping element of the first component and/or the at least one clamping element of the second component is connected integrally to the respective first or second component.

8. The component connection according to claim 1, wherein the at least one clamping element of the first component and/or the at least one clamping element of the second component is formed by a bent portion of the rim of the through-hole of the respective first or second components.

9. The component connection according to claim 1, further comprising a permanent connection between the first and second components in addition to a detachable clamping connection formed by the connecting element and the first and second components.

10. The component connection according to claim 9, wherein the permanent connection is a welded, screwed, riveted or adhesively bonded connection.

11. The component connection according to claim 1, wherein the first and second components are oriented with respect to one another via a form-fitting connection of the first and second components in addition to a releasable connection formed by the connecting element.

12. The component connection according to claim 11, wherein the form-fitting connection comprises an elevation formed on the first component and a depression formed on the second component, wherein the elevation engages in a form-fitting manner into the depression.

13. The component connection according to claim 1, wherein the first and second components each have a centering hole that is aligned with one another, wherein a centering pin is introduced into the centering holes.

14. The component connection according to claim 1, wherein:
   the at least one clamping element of the first component is welded to the first spherical or spheroidal element, and/or
   the at least one clamping element of the second component is welded to the second spherical or spheroidal element.

15. The component connection according to claim 1, wherein:

the at least one clamping element of the first component is a clamping collar that encircles the through-hole of the first components, and/or the at least one clamping element of the second component is a clamping collar that encircles the through-hole of the second component.

16. The component connection according to claim 15, wherein:

the encircling clamping collar of the first component is welded to the first of the at least two spherical or spheroidal elements, and/or the encircling clamping collar of the second component is welded to the second of the at least two spherical or spheroidal elements.

17. A method of connecting a first component having a through-hole to a second component having a through-hole, the method comprising the acts of:

arranging the first and second components with respect to one another such that the through-holes at least partially overlap one another;

attaching a connecting element comprising at least two spherical or spheroidal elements in order to connect the first and second components in a clamped manner, wherein a first of the spherical or spheroidal elements projects out of the through-hole in the first component on a first side of the first component, and a second of the spherical or spheroidal elements projects out of through-hole in the second component on a first side of the second component that faces away from the first side of the first component, a clamping element that projects from a hole rim of the through-hole of the first component bears externally against the first of the spherical or spheroidal elements in a clamping manner, and a clamping element that projects from a hole rim of the through-hole of the second component bears externally against the second spherical or spheroidal element in a clamping manner.

18. The method according to claim 17, wherein the clamping elements connect the first and second components together in a pre-fixed relative manner, and the first and second components are subsequently connected permanently together.

19. The method according to claim 18, wherein the arranging of the first and second components with respect to one another is such that the respective through-holes are eccentrically arranged with respect to one another.

20. The method according to claim 18, further comprising the act of welding the clamping elements to the respective spherical or spheroidal elements via laser welding to connect the first and second components together permanently.

* * * * *